(12) United States Patent
Hall et al.

(10) Patent No.: US 6,196,501 B1
(45) Date of Patent: Mar. 6, 2001

(54) SATELLITE ARCHITECTURE WITH DEPLOYABLE ELECTRICAL EQUIPMENT

(75) Inventors: John C. Hall, Rancho Palos Verdes; Walter S. Gelon, Redwood City; Robert E. Helmer, Pleasanton, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/168,029

(22) Filed: Oct. 7, 1998

(51) Int. Cl.$^7$ .................................................. B64G 1/50
(52) U.S. Cl. ......................................... 244/163; 244/158 R
(58) Field of Search ............................... 244/163, 158 R, 244/173

(56) References Cited

U.S. PATENT DOCUMENTS

| | | | |
|---|---|---|---|
| 4,727,932 | * | 3/1988 | Mahefkey ............................ 244/163 |
| 4,832,113 | * | 5/1989 | Mims et al. .......................... 244/163 |
| 5,794,890 | * | 8/1998 | Jones, Jr. et al. .................... 244/163 |
| 5,806,800 | * | 9/1998 | Caplin ................................. 244/163 |

* cited by examiner

*Primary Examiner*—J. Woodrow Eldred
(74) *Attorney, Agent, or Firm*—Perman & Green, LLP

(57) ABSTRACT

A spacecraft comprises a first module including a first assembly of components and a second module including a second assembly of components and a thermal radiator. The second module is movable between a stowed position proximate the first module whereat the thermal radiator is only partially operative and a deployed position distant from the first module whereat the thermal radiator means is fully operative for dissipating waste heat to deep space for at least one of the first and second assemblies of components. In one embodiment, the first module includes a housing defining an interior cavity, the second module including a casing so shaped and dimensioned as to be telescopically received within the internal cavity of the first module and the second module being translationally movable along a deploying axis between the stowed position and the deployed position but incapable of mutual rotation about the deploying axis. In another embodiment, a spacecraft includes a plurality of discrete faces and comprises an equipment panel including an assembly of heat generating components which require cooling, a thermal radiator, and a connecting hinge mounting the equipment panel for pivotal movement between a stowed position proximate one of said faces whereat the thermal radiator is only partially operative and a deployed position distant from the face whereat said thermal radiator means is fully operative for dissipating waste heat from the assembly to deep space.

27 Claims, 6 Drawing Sheets

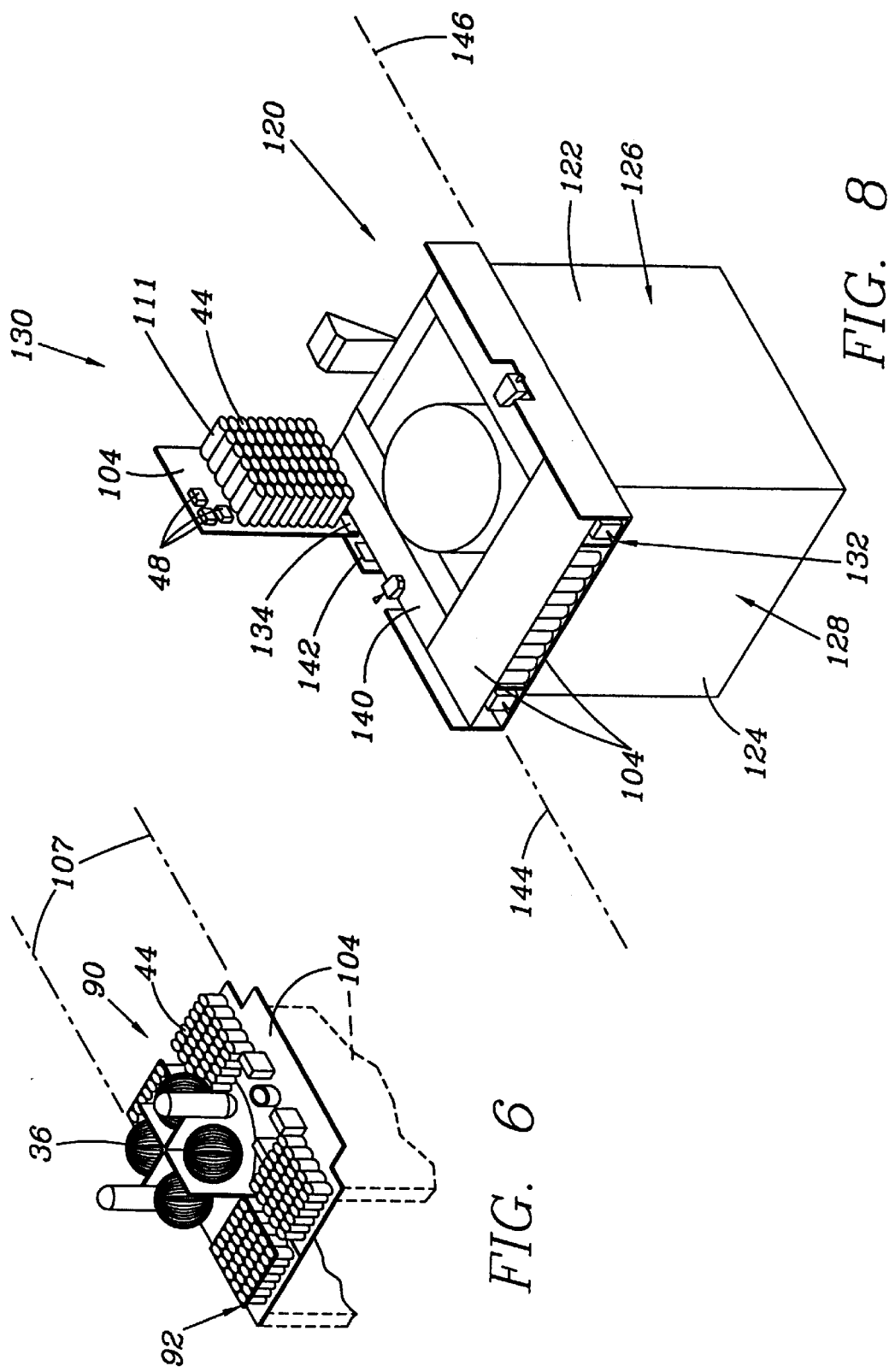

SATELLITE ARCHITECTURE WITH DEPLOYABLE ELECTRICAL EQUIPMENT

BACKGROUND OF THE INVENTION

1. Field of the Invention

The present invention relates generally to a system for dissipating waste heat from heat generating equipment such as electronic components borne by satellites when in orbit. While the invention will be described in the context of a geosynchronous satellite, it will be understood that the teachings of the invention are applicable to any kind of a satellite whether in earth orbit or in some other orbit.

2. Description of the Prior Art

Communication satellite payload power requirements continue to rise. The increase in satellite payload in turn requires that the satellite allow for (a) increased equipment mounting area, and (b) increased waste heat thermal dissipation. In addition it is highly desirable that this increased capability be accommodated with the minimum increase in the satellite mass and size. The former requirement is obvious as launch cost tends to be proportional to mass. The latter requirement is based on the same issue in that larger satellite require in turn larger fairings which are heavier, have greater aerodynamic drag (reduced lift capability), and are more costly.

The two conventional approaches for addressing the above issues are 1. increase of the satellite body size thereby increasing its equipment mounting area and thermal radiating area which in turn increases the dissipation capability; the problem with this approach is that the larger satellite requires a larger fairing hence reducing launch mass per the above discussion; and
2. use of deployable thermal radiators to increase the total satellite radiating area; this approach does not address the mounting area requirements and adds mass for the deployable radiator.

The ideal solution would be one in which equipment mounting and thermal dissipation areas are increased in a satellite of small body size. The problem is identification of available surface area. In present satellites about 80% of the North-South panel area is already occupied with payload equipment. The East-West faces are typically divided between the battery radiator and the output multiplexer (OMUX) for a communication satellite, a non-electronic component capable of operating at high temperatures and capable of usefully dissipating heat even when its mounting surface is subject to direct solar illumination. The earth deck is increasingly filled with communication receiving equipment. Only the anti-earth deck remains largely unoccupied, however, as this surface is subject to 12 hours of direct solar illumination every day and therefore is not generally useful by itself as a thermal radiator.

It was with knowledge of the foregoing state of the technology that the present invention has been conceived and is now reduced to practice.

SUMMARY OF THE INVENTION

The present invention relates to a satellite comprising first and second modules. The first module includes a first assembly of components and the second module includes a second assembly of components and a thermal radiator. The second module is movable between a stowed position proximate the first module whereat the thermal radiator is only partially operative and a deployed position distant from the first module whereat the thermal radiator means is fully operative for dissipating waste heat to deep space for at least one of the first and second assemblies of components. In one embodiment, the first module includes a housing defining an interior cavity, the second module including a casing so shaped and dimensioned as to be telescopically received within the internal cavity of the first module and the second module being translationally movable along a deploying axis between the stowed position and the deployed position but incapable of mutual rotation about the deploying axis. In another embodiment, a satellite includes a plurality of discrete faces and comprises an equipment panel including an assembly of heat generating components which require cooling, a thermal radiator, and a connecting hinge mounting the equipment panel for pivotal movement between a stowed position proximate one of said faces whereat the thermal radiator is only partially operative and a deployed position distant from the face whereat said thermal radiator means is fully operative for dissipating waste heat from the assembly to deep space.

The basic concept of the present invention, then, is to combine electrical equipment into modules which are stowed within the satellite during launch and deployed from the satellite after launch. This concept is most applicable to the satellite bus equipment as the connections between this equipment and the satellite are non-rigid, generally cables or the like. A similar concept is also disclosed for the EPC (electric power converter) to TWTA (travelling wave tube amplifier) connection which is, once again, non-rigid.

Body stabilized satellites are typically right rectangular prisms with equipment mounted on the inside face surfaces. The interior volume of the satellite is principally occupied with fuel tanks, however, such utilization is typically not complete. According to the present invention, the deployed surface area of the satellite is increased by nesting one or more internal modules within the main satellite body. These internal modules are stowed during launch but deployed on orbit. The concept is enabled by (a) the low profile of equipment mounted to satellite surfaces, (b) the partial volumetric utilization of the present satellite, and (c) the fact that the connection between the bus equipment mounted on the deployable module and the satellite is adequately flexible. Furthermore, as the bus components tend to be individually severable, the concept is tailorable to the overall satellite, that is, if insufficient internal volume is available for stowage of the entire bus, then a partial implementation is possible where only selected elements of the bus (e.g., the battery) are configured on the deployable module.

An example of the concept is illustrated in FIGS. 1 and 2. FIGS. 1 and 2 illustrate a satellite after deployment of a bus module which includes a battery and an equipment deck accommodating most of the electronic bus equipment. In this embodiment, the prismatic bus module is attached via deployment rails to the central cylinder of the satellite. The center of the module is a hollow cylinder which allows it to be stowed in a nested configuration with the central cylinder. Once the satellite has reached its operating orbit the module is lowered via deployment rails past the anti-earth face of the main satellite body thereby increasing the total surface area and hence heat dissipation of the satellite. The bus module required surface area may be more or less freely adjusted by changing the height of the module and or its radiator extension panels. The length and width of the module are relatively more constrained by the need to need to allow for mounting of equipment on the inside surfaces of the main satellite body. The result is an increase in the heat rejection capability of the satellite and hence payload in direct proportion to the achieved increase in radiator area as a result of deployment of the internally mounted bus module.

An alternative example of a deployable bus module is provided in FIG. 3. In this instance, the module is intended for a satellite architecture m which fuel is stored in an array of tanks located near the aft end of the satellite, thereby lowering satellite CG (center of gravity) as opposed tanks stacked inside the central cylinder. The deployable module containing the very heavy satellite batteries and bus equipment is stowed immediately below the fuel tanks thereby further enhancing the lowering of the satellite CG.

As illustrated in FIG. 4, the deployment approach for the non central cylinder module is to hinge the module from the lower edges of the north and south satellite faces. In this instance, the module radiator area appears to be fixed by the length and thickness of the satellite main body. In fact, this is not strictly the case as the hinged modules may in fact be double faced and may in the limit effectively double the radiation capability relative to the surface area of the aft panel, depending upon specific panel and deployment designs, the degree to which the view factor of the two inner hinged panel surfaces interfere with each other, view factor blockage by main satellite body, and solar reflectance from the main satellite body. The present invention exploits the double faced radiator by:

1. Use of a double ended battery sleeve surrounding each cell (see detail provided in FIGS. 5 and 6) which acts to conduct heat to both radiator faces. This approach has the added benefit of eliminating the need for battery stiffening hardware as the two radiator panels act intrinsically as stiffening members.
2. Selectively mounting bus equipment to the two faces which both distributes bus equipment heat and increases total mounting area (see FIGS. 5 and 6).

Also illustrated in FIG. 4 is an additional implementation of the deployment concept of the invention. The EPCs (electric power converters) which provide high voltage power to the payload TWTAs (traveling wave tube amplifiers) are deployed from vertical hinged panels to face north and south during satellite operation. During launch these payload panels may be stowed on either the east/west or north/south faces. Once the operating station is achieved and the solar arrays and reflectors are deployed, the EPC module panels are unfurled. In addition to providing additional radiation capability for the satellite deployment of cable connected components (either bus or payload), the invention provides the further advantage of increasing satellite equipment mounting area. This, in turn, leads to more easily built and hence lower cost satellites.

A primary feature, then, of the present invention is the provision of a system for dissipating waste heat from heat generating equipment borne by satellites when in orbit.

Another feature of the present invention is the provision of satellite battery bus architecture which is internally housed in the satellite during launch and deployed from the satellite once in orbit.

Still another feature of the present invention is the provision of such satellite architecture which increases available radiator area and mounting area for non flexible payload equipment such as TWTA, wave guides, OMUXs, feeds and reflectors.

Yet another feature of the present invention is the provision of such a satellite architecture in which the modules are hinge mounted to the aft edges of the satellite.

Still a further feature of the present invention is the provision of such satellite architecture in which the module is rail mounted to a central cylinder.

Yet a further feature of the present invention is the provision of such satellite architecture in which some or all of the power subsystem electrical equipment is co-mounted on the battery structure in a fashion that both are deployed on orbit.

Still another feature of the present invention is the provision of such satellite architecture according to which bus equipment is mounted to both the outward facing and inward facing radiators of a deployed module such that both radiator surfaces dissipate waste bus equipment heat.

Still another feature of the present invention is the provision of such satellite architecture which the battery/bus equipment is mounted at the aft end of the satellite thereby lowering the CG of the satellite once deployed and facilitating attitude control.

Yet a further feature of the present invention is the provision of such satellite architecture in which the east and west edges of the outer radiator extend to the edge of the fairing at the mid line of the satellite.

Still another feature of the present invention is the provision of such satellite architecture in which the battery is a nickel hydrogen battery.

Yet a further feature of the present invention is the provision of such satellite architecture in which the battery sleeves mount to the inner and outer facing radiators of a deployed module such that the battery is cooled from both surfaces.

Still another feature of the present invention is the provision of such satellite architecture in which the battery is a lithium ion battery.

Yet a further feature of the present invention is the provision of such satellite architecture in which the payload equipment panels are furled during satellite launch the and unfurled once the satellite is in operation.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. like numerals refer to like parts throughout the disclosure.

BRIEF DESCRIPTION OF THE DRAWINGS

FIG. 6 is a perspective view of the satellite illustrated in FIGS. 4 and 5 but presenting additional detail;

FIG. 8 is a perspective view of a satellite, similar to those illustrated in FIGS. 1–3 and FIGS. 4–6 but presenting still another embodiment of the invention.

DETAILED DESCRIPTION OF THE PREFERRED EMBODIMENTS

Figure 2:
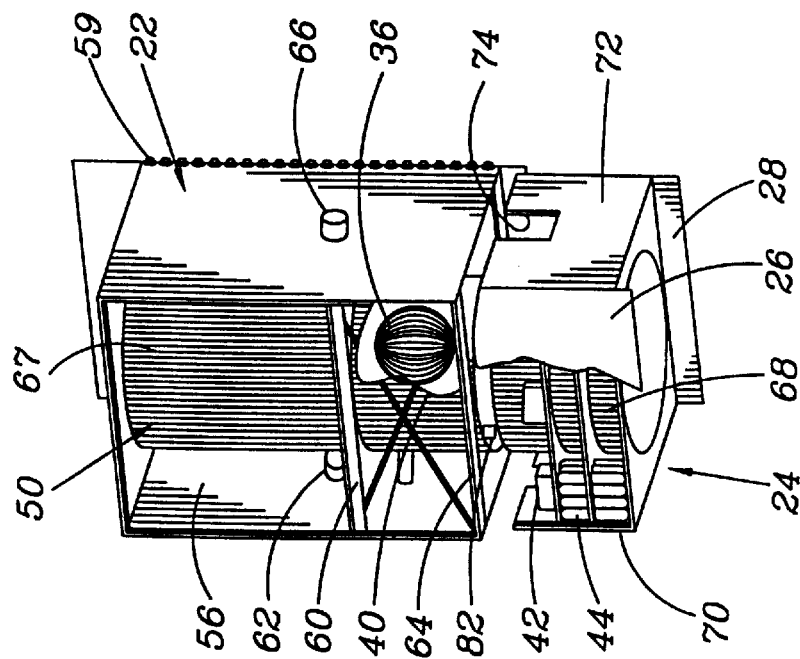
FIG. 2 is a perspective view of a satellite embodying the invention, similar to FIG. 1, but with the first and second modules in their deployed configuration.
Figure 1:
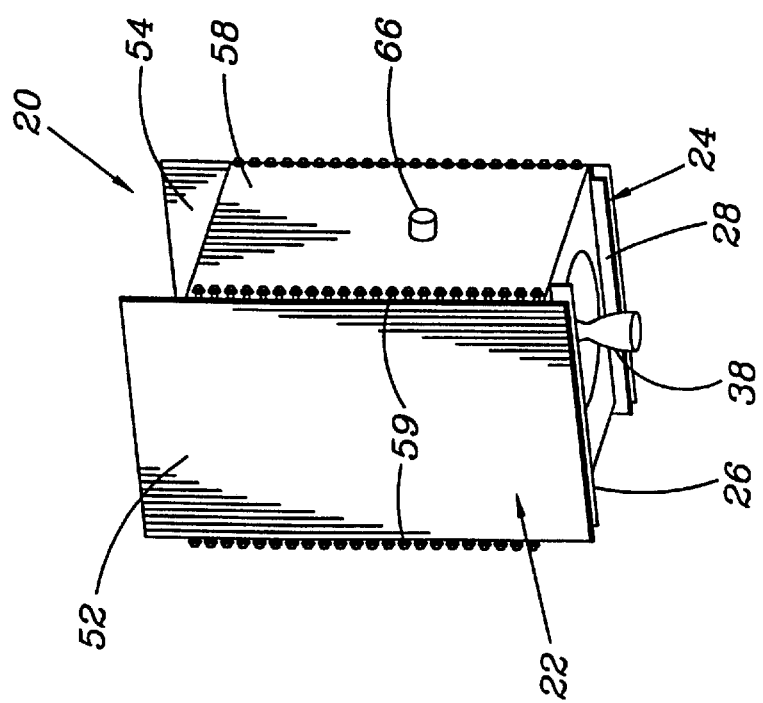
FIG. 1 is a perspective view of a satellite embodying the invention, having first and second modules in their stowed configuration.

Turn now to the drawings and, initially, to FIGS. 1 and 2 which generally illustrate a spacecraft or satellite 20 comprising a first module 22 including a first assembly of components and a second module 24 including a second assembly of components and a pair of opposed thermal radiator panels 26, 28, respectively. These may be the north and south battery radiator panels for the satellite 20. The second module 24 is movable between a stowed position (FIG. 1) proximate the first module 22 at which the thermal radiator panels 26 are only partially operative and a deployed position (FIG. 2) distant from the first module at which the thermal radiator panels 26, 28 are fully operative for dissipating waste heat to deep space for at least one of the first and second assemblies of components.

It will be appreciated that the phrases "first assembly of components" and "second assembly of components" may define different groupings of components in different instances. For example, in one instance, the first assembly of components may include payload, including high power amplifiers such as TWTs 59, receivers, input and output multiplexers, transmitters, input and output switches, hybrids, and the like, along with such useful items concerned directly with the programmed mission of the satellite 20 as solar arrays 30 comprised of multiple solar panels 32 and communication antennas 34 (see FIG. 3) while the second assembly of components may include an array of fuel tanks 36, thruster devices 38 for selectively repositioning the satellite in space, conduits 40 for delivering fuel from the array of fuel tanks to the thruster devices, electronic bus equipment 42, and a plurality of batteries 44 for powering the first and second assemblies of components. In another instance, the first assembly of components may include the payload items mentioned above, an array of fuel tanks 36, thruster devices 36, and conduits 40 while the second assembly of components includes electronic bus equipment 42 and a plurality of batteries 44.

In still another instance, the first assembly of components may again include the payload items mentioned above, an array of fuel tanks 36, thruster devices 38, conduits 40, and electronic bus equipment 42 while the second assembly of components includes a plurality of batteries 44.

Figure 2A:
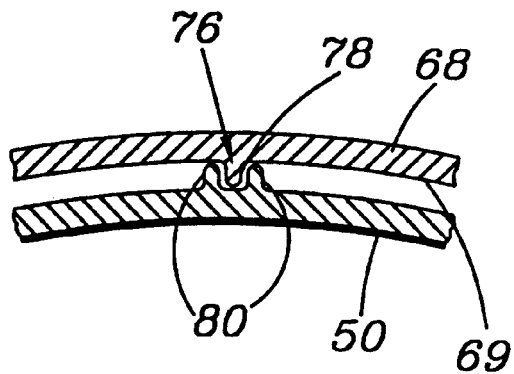
FIG. 2A is a detail view, in section, of components illustrated in FIGS. 1 and 2.
Figure 2B:
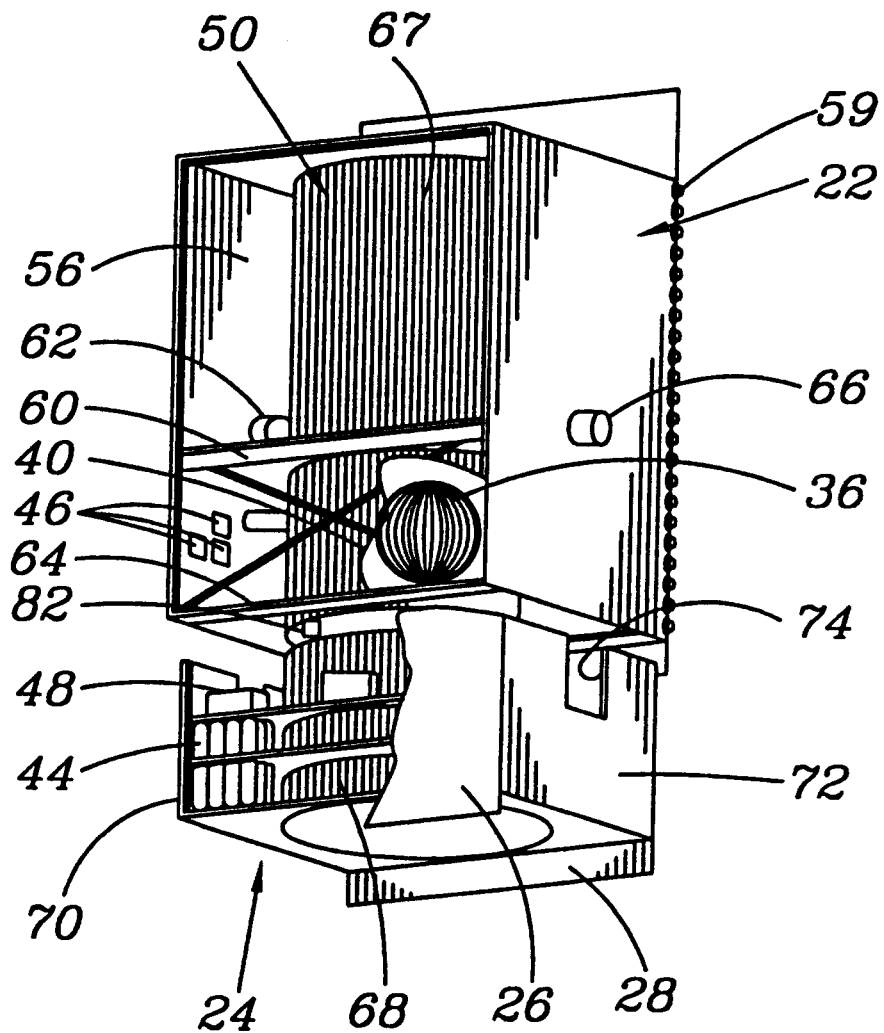
FIG. 2B is a perspective view of a satellite similar to FIG. 2 but illustrating another embodiment of the invention.

In yet another instance, viewing FIG. 2B, the first assembly of components may again include the payload items mentioned above, an array of fuel tanks 36, thruster devices 38, conduits 40 and a first set 46 of electronic bus equipment while the second assembly of components includes a second set 48 of electronic bus equipment, and a plurality of batteries 44 for powering the first and second assemblies of components. In this instance, the electronic bus functions may be split between the first and second modules 22, 24. The first set 46 may be operable for completing one part of the power subsystem functions such as discharge control of the batteries and the second set 48 may be operable for completing other power subsystem functions such as charge control of the batteries.

Figure 3:
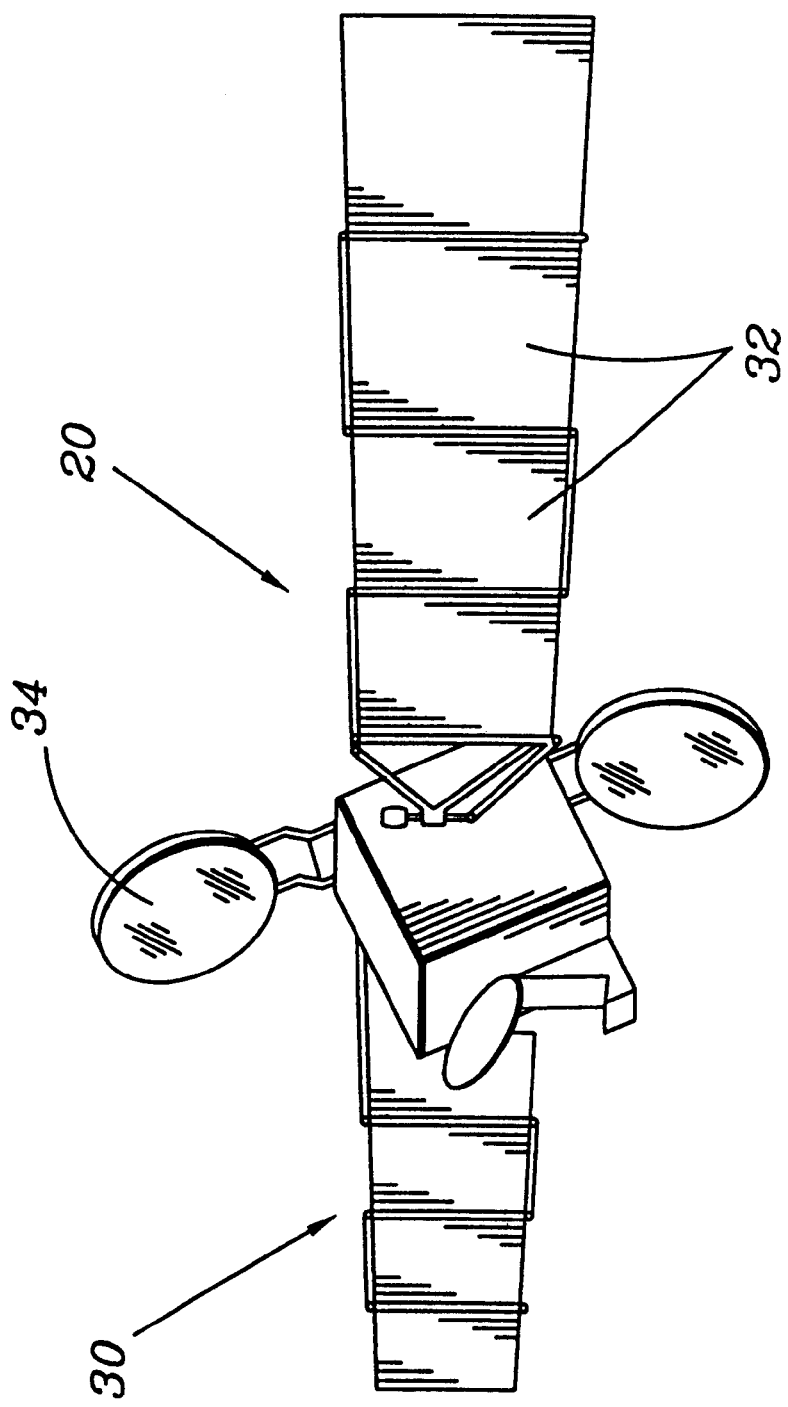
FIG. 3 is a perspective view of the satellite of FIGS. 1 and 2 on orbit with its solar array and communications antennas fully deployed.

Continuing to view FIGS. 1 and 2, the first module 22 includes a tubular housing 50 for structurally supporting such items as north and south communication panels 52, 54, east and west communication panels 56, 58 and traveling wave tubes 59 thereon, fuel tanks 36, thruster devices 38, ACS (attitude control subsystem) deck 60 and momentum wheels 62 thereon, thruster shelf 64 and its and supports, and yokes 66 for the antennas 34 (FIG. 3). The housing 50 may be cylindrical, oval, polygonal, or of other suitable cross sectional shape defining an exterior surface 67. The second module 24 includes a tubular casing 68 so shaped and dimensioned as to define an interior surface 69 which is telescopically received over the exterior surface 67 of the housing 50 of the first module 22 and in close conformity with the housing. As with the housing 50, the casing 68 serves to structurally support such items as east and west bus radiators 70, 72 configured with a yoke clearance slot 74, the thermal radiator panels 26, 28, equipment decks 60, 64 and, as illustrated in FIG. 2, the electronic bus equipment 42 and batteries 44. The second module 24 is translationally movable relative to the first module 22 along a deploying axis between the stowed position (FIG. 1) and the deployed position (FIG. 2) but incapable of mutual rotation about the deploying axis. This is achieved by means of a mutually slidably engageable key mechanism 76 (FIG. 2A) shared by the housing 50 and casing 68. To this end, the key mechanism 76 includes, for example, a longitudinally extending rib 78 projecting from the interior surface 69 of the casing 68 in slidable engagement with and between a longitudinally extending channel member 80 projecting from the exterior surface 67 of the housing 50. Other suitable constructions of the key mechanism 76 could also be envisioned.

As diagrammatically depicted in FIG. 2, a suitable actuator 82 mounted on the first module 22 is connected to the second module 24 for moving the second module between the stowed and deployed positions.

Figure 5:
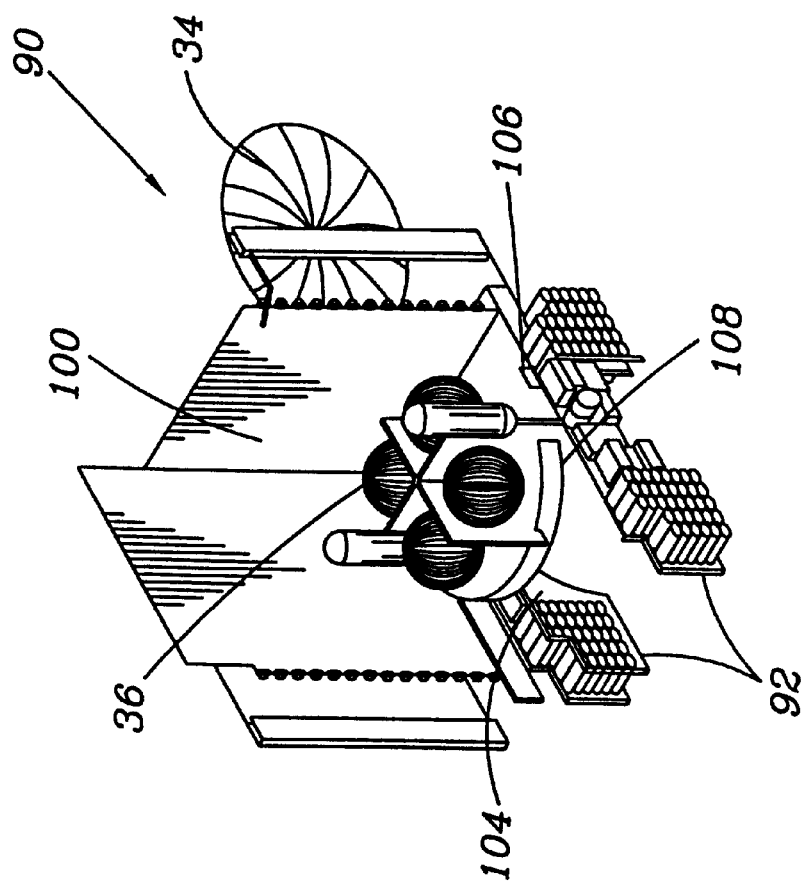
FIG. 5 is a perspective view, with panels removed for clarity, of the satellite illustrated in FIG. 4 but with the first and second modules in their deployed configuration.
Figure 4:
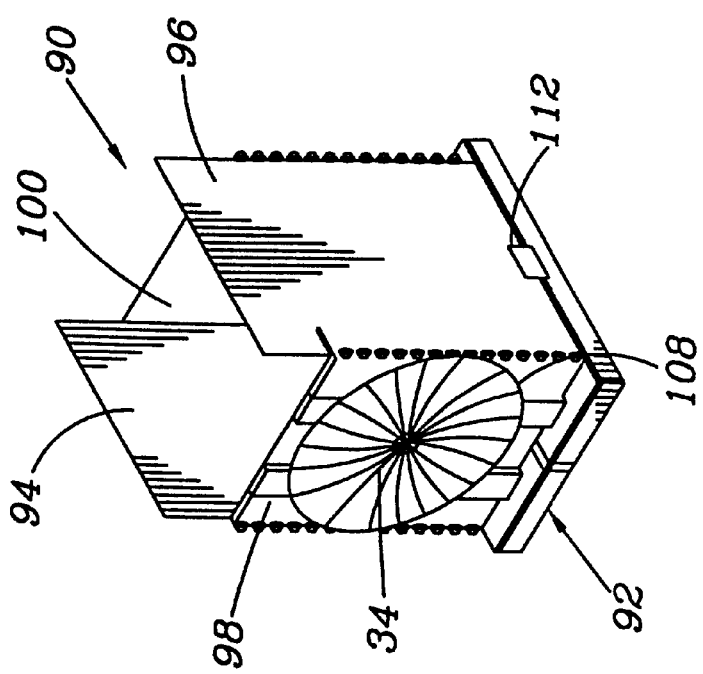
FIG. 4 is a perspective view of a satellite, similar to that illustrated in FIGS. 1–3, but presenting another embodiment of the invention, and having first and second modules in their stowed configuration.

Turn now to FIGS. 4, 5, and 6 which illustrate another embodiment of the invention. In this instance, a satellite 90 includes a pair of equipment panels 92, although there may be only one or more than two such equipment panels within the context of the invention. As with the satellite 20, the satellite 90 has a plurality of discrete faces defined by north and south communication panels 94, 96, respectively, and by east and west communication panels 98, 100, respectively. Communication antennas 34 are also typically illustrated suitably mounted for movement between a stowed position (FIG. 4) and a deployed position (FIG. 5). Each equipment panel 92 includes an assembly of heat generating components which require cooling, here illustrated as batteries 44 and also includes thermal radiator plates 104. Some manner of connectors 106 such as hinges, suitably placed and numbered, are provided for mounting each equipment panel 92 for movement between a stowed position (FIG. 4) proximate one of the faces of the satellite, such as an anti-earth face 108, such that the thermal radiator plates 104 are only partially operative and a deployed position distant from the face 108 at which position each thermal radiator plate is fully operative for dissipating waste heat to deep space from the assembly of heat generating components such as the batteries 44.

Figure 7:
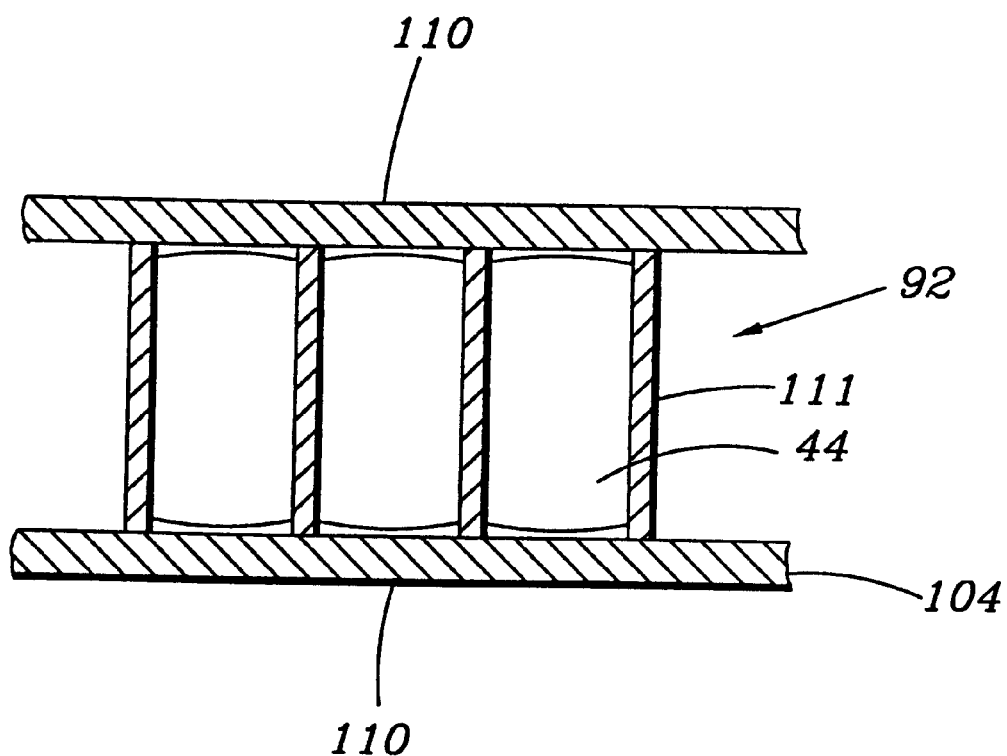
FIG. 7 is a detail view, in section, of a component of the invention.

Viewing FIG. 7, each thermal radiator plate 104 is seen to include at least one thermal radiative surface 110 for radiating heat therefrom to deep space in when the equipment panel 92 is moved to the deployed position. The batteries 44 typically are mounted in sleeves 111 which extend between and are bonded to the plates 104. Preferably, each equipment panel 92 includes a pair of opposed thermal radiative surfaces 110 for radiating heat therefrom to deep space in opposite directions when in the deployed position, see especially FIG. 5. In the construction of FIGS. 4, 5, and 6, a suitable actuator 112 is diagrammatically indicated in FIG. 4 for moving the equipment panels 92 between the stowed and deployed positions. As earlier mentioned, the connectors 106 include one or more hinges mounting each equipment panel for movement about a pivot axis 107 between a stowed position (FIG. 4) at which the radiator plates 104 are only partially operative and a deployed position (FIGS. 5 and 6) at which the thermal radiator plates are fully operative for dissipating waste heat to deep space from the assembly of heat generating components. As seen in FIG. 6, the equipment panels 92 actually swing about the pivot axes 107 which are spaced apart and mutually parallel.

Turn now, however, to FIG. 8 which illustrates yet another embodiment of the invention. In this instance, a satellite 120, again including a plurality of discrete faces 122, 124 defined, respectively, by north and east communication panels 126, 128, respectively. The satellite 120 includes opposed equipment panels 130, 132, each including an assembly of heat generating components such as batteries 44 which require cooling. In the manner illustrated in FIG. 7, the batteries 44 are sandwiched between thermal radiator plates 104. Also, the equipment panels are mounted, as by hinges 134, for pivotal movement about parallel, spaced out pivot axes 144, 146 between a stowed position proximate one of the faces 140, an anti-earth face, for example, at which the thermal radiator plates are only partially operative and a deployed position distant from the face 140 at which the thermal radiator plates are filly operative for dissipating waste heat to deep space from the assembly of heat generating components.

In FIG. 8, it will be appreciated that equipment panel 132 (the panel nearer the reader) is depicted as stowed while the equipment panel 130 (the panel farther away from the reader) is depicted as fully deployed. The latter panel also is lacking the thermal radiation plate 104 facing the reader for clarity of illustrating its construction. Also as with the equipment panels 92, the equipment panels i30, 132 are operated by means of suitable actuators 142 which move them between the stowed and deployed positions. A major difference between the operation of the equipment panels 92 and the operation of the equipment panels 130, 132 resides in the fact that the equipment panels 130, 132 are laterally spaced apart in the direction of their respective pivot axes 144, 146. Thus, there is no interference between the thermal radiator plates 104 of the equipment panel 130 and of the equipment panel 132 when they are fully deployed thereby effectively maximizing their performance.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A spacecraft comprising:
   a first module including a first assembly of components; and
   a second module including a second assembly of components and thermal radiator means, said second module being movable between a stowed position proximate said first module whereat said thermal radiator means is only partially operative and a deployed position distant from said first module whereat said thermal radiator means is fully operative for dissipating waste heat to deep space for at least one of said first and second assemblies of components.

2. The spacecraft as set forth in claim 1
   wherein said first module includes a housing defining an interior cavity;
   wherein said second module includes a casing so shaped and dimensioned as to be telescopically received within the internal cavity of said first module; and
   whereby said second module is translationally movable along a deploying axis between the stowed position and the deployed position.

3. The spacecraft as set forth in claim 2
   wherein said housing has a polygonal transverse cross section; and
   wherein said casing has a polygonal transverse cross section.

4. The spacecraft as set forth in claim 3
   wherein said housing and said casing are similarly shaped and dimensioned so as to be mutually translatable as said second module moves between a stowed position and a deployed position but incapable of mutual rotation about the deploying axis.

5. The spacecraft as set forth in claim 2 including:
   actuating means on said first module for moving said second module between the stowed and deployed positions.

6. The spacecraft as set forth in claim 1
   wherein said first assembly of components includes payload; and
   wherein said second assembly of components includes an array of fuel tanks, thruster means for selectively repositioning said spacecraft in space, conduit means for delivering fuel from said array of fuel tanks to said thruster means, electronic bus equipment; and a plurality of batteries for powering said first and second assemblies of components.

7. The spacecraft as set forth in claim 1
   wherein said first assembly of components includes payload, an array of fuel tanks, thruster means for selectively repositioning said spacecraft in space, and conduit means for delivering fuel from said array of fuel tanks to said thruster means; and
   wherein said second assembly of components includes electronic bus equipment and a plurality of batteries for powering said first and second assemblies of components.

8. The spacecraft as set forth in claim 1
   wherein said first assembly of components includes payload, an array of fuel tanks, thruster means for selectively repositioning said spacecraft in space, conduit means for delivering fuel from said array of fuel tanks to said thruster means, and electronic bus equipment; and wherein said second assembly of components includes a plurality of batteries for powering said first and second assemblies of components.

9. The spacecraft as set forth in claim 1
   wherein said first assembly of components includes payload, an array of fuel tanks, thruster means for selectively repositioning said spacecraft in space, conduit means for delivering fuel from said array of fuel tanks to said thruster means, and a first set of electronic bus equipment; and
   wherein said second assembly of components includes a second set of electronic bus equipment and a plurality of batteries for powering said first and second assemblies of components.

10. The spacecraft as set forth in claim 1
wherein said first module includes a first central tubular member having an exterior surface;
wherein said second module includes a second central tubular member having an interior surface telescopically slidably received over said exterior surface of said first central tubular member; and
wherein said first and second central tubular members include mutually slidably engageable key means;
whereby said second module is translationally movable along a deploying axis between the stowed position and the deployed position but incapable of mutual rotation about the deploying axis.

11. The spacecraft as set forth in claim 10
wherein said first and second central tubular members each has a substantially circular transverse cross section.

12. A spacecraft including a plurality of discrete faces comprising:
an equipment panel including:
an assembly of heat generating components which require cooling;
thermal radiator means; and
connection means mounting said equipment panel for movement between a stowed position proximate one of said faces whereat said thermal radiator means is only partially operative and a deployed position distant from said face whereat said thermal radiator means is fully operative for dissipating waste heat to deep space from said assembly of heat generating components.

13. The spacecraft as set forth in claim 12
wherein said equipment panel includes at least one thermal radiator surface for radiating heat therefrom to deep space when in the deployed position.

14. The spacecraft as set forth in claim 12
wherein said equipment panel includes a pair of opposed thermal radiator surfaces for radiating heat therefrom to deep space in opposite directions when in the deployed position.

15. The spacecraft as set forth in claim 12 including:
actuating means on said spacecraft for moving said equipment panel between the stowed and deployed positions.

16. The spacecraft as set forth in claim 12
wherein said connection means includes a hinge mounting said equipment panel for movement about a pivot axis between a stowed position whereat said thermal radiator means is only partially operative and a deployed position whereat said thermal radiator means is fully operative for dissipating waste heat to deep space from said assembly of heat generating components.

17. A spacecraft including a plurality of discrete faces comprising:
a first equipment panel including:
an assembly of heat generating components which require cooling;
thermal radiator means; and
first hinge means mounting said first equipment panel for movement about a first pivot axis between a stowed position proximate one of said faces whereat said thermal radiator means is only partially operative and a deployed position distant from said one face whereat said thermal radiator means is fully operative for dissipating waste heat to deep space from said assembly of heat generating components; and
a second equipment panel including:
an assembly of heat generating components which require cooling;
thermal radiator means; and
second hinge means mounting said second equipment panel for movement about a second pivot axis parallel to and spaced from said first pivot axis between a stowed position proximate another of said faces whereat said thermal radiator means is only partially operative and a deployed position distant from said another face whereat said thermal radiator means is fully operative for dissipating waste heat to deep space from said assembly of heat generating components.

18. The spacecraft as set forth in claim 17
wherein each of said first and second equipment panels includes a pair of opposed thermal radiator surfaces for radiating heat therefrom to deep space in opposite directions when in the deployed position.

19. The spacecraft as set forth in claim 17
wherein each of said first and second equipment panels includes at least one thermal radiator surface for radiating heat therefrom to deep space in when in the deployed position.

20. The spacecraft as set forth in claim 17 including:
actuating means on said spacecraft for moving each of said first and second equipment panels between the stowed and deployed positions.

21. A spacecraft including a plurality of discrete faces comprising:
a first equipment panel including:
an assembly of heat generating components which require cooling;
thermal radiator means; and
first hinge means mounting said first equipment panel for movement about a first pivot axis between a stowed position proximate one of said faces whereat said thermal radiator means is only partially operative and a deployed position distant from said one face whereat said thermal radiator means is fully operative for dissipating waste heat to deep space from said assembly of heat generating components; and
a second equipment panel including:
an assembly of heat generating components which require cooling;
thermal radiator means; and
second hinge means mounting said second equipment panel for movement about a second pivot axis parallel with and spaced from said first pivot axis between a stowed position proximate said one face whereat said thermal radiator means is only partially operative and a deployed position distant from said another face whereat said thermal radiator means is fully operative for dissipating waste heat to deep space from said assembly of heat generating components.

22. The spacecraft as set forth in claim 21
wherein each of said first and second equipment panels includes a pair of opposed thermal radiator surfaces for radiating heat therefrom to deep space in opposite directions when in the deployed position.

23. The spacecraft asset forth in claim 21
wherein each of said first and second equipment panels includes at least one thermal radiator surface for radiating heat therefrom to deep space in when in the deployed position.

24. The spacecraft as set forth in claim 21 wherein said first and second equipment panels are laterally spaced apart in the direction of the first and second pivot axes.

25. The spacecraft as set forth in claim 1 wherein said first assembly of components includes payload, an array of fuel tanks, thruster means for selectively repositioning said spacecraft in space, and conduit means for delivering fuel from said array of fuel tanks to said thruster means; and wherein said second assembly of components includes electronic bus equipment and a plurality of batteries for powering said first and second assemblies of components; and including:

hinge means mounting said second module on said first module for movement between a stowed position proximate one of said faces whereat said thermal radiator means is only partially operative and a deployed position distant from said face whereat said thermal radiator means is fully operative for dissipating waste heat to deep space from at least one of said first and second assemblies of components.

26. The spacecraft as set forth in claim 1 wherein said first assembly of components includes payload, an array of fuel tanks, thruster means for selectively repositioning said spacecraft in space, conduit means for delivering fuel from said array of fuel tanks to said thruster means, and electronic bus equipment; and wherein said second assembly of components includes a plurality of batteries for powering said first and second assemblies of components; and including:

hinge means mounting said second module on said first module for movement between a stowed position proximate one of said faces whereat said thermal radiator means is only partially operative and a deployed position distant from said face whereat said thermal radiator means is fully operative for dissipating waste heat to deep space from at least one of said first and second assemblies of components.

27. The spacecraft as set forth in claim 1 wherein said first assembly of components includes payload, an array of fuel tanks, thruster means for selectively repositioning said spacecraft in space, conduit means for delivering fuel from said array of fuel tanks to said thruster means, and a first set of electronic bus equipment; and wherein said second assembly of components includes a second set of electronic bus equipment and a plurality of batteries for powering said first and second assemblies of components; and including:

hinge means mounting said second module on said first module for movement between a stowed position proximate one of said faces whereat said thermal radiator means is only partially operative and a deployed position distant from said face whereat said thermal radiator means is filly operative for dissipating waste heat to deep space from at least one of said first and second assemblies of components.

\* \* \* \* \*